(12) United States Patent
Kim

(10) Patent No.: US 8,471,980 B2
(45) Date of Patent: Jun. 25, 2013

(54) BACKLIGHT UNIT AND LIQUID CRYSTAL DISPLAY DEVICE HAVING THE SAME

(75) Inventor: Min Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 685 days.

(21) Appl. No.: 12/559,831

(22) Filed: Sep. 15, 2009

(65) Prior Publication Data

US 2010/0157198 A1 Jun. 24, 2010

(30) Foreign Application Priority Data

Dec. 23, 2008 (KR) .................. 10-2008-0132719

(51) Int. Cl.
- *G02F 1/1335* (2006.01)
- *F21V 7/04* (2006.01)
- *F21V 3/00* (2006.01)
- *G09F 13/04* (2006.01)

(52) U.S. Cl.
USPC .. 349/64; 362/97.2; 362/311.01; 362/311.04; 362/311.06; 362/617

(58) Field of Classification Search
USPC .................. 349/62, 64–65; 362/311.01, 606, 362/617, 97.2, 311.04, 311.06
See application file for complete search history.

(56) References Cited

U.S. PATENT DOCUMENTS

| | | | | |
|---|---|---|---|---|
| 2006/0007703 | A1* | 1/2006 | Wang et al. | 362/613 |
| 2008/0089063 | A1* | 4/2008 | Chen | 362/246 |
| 2008/0129924 | A1* | 6/2008 | Moon et al. | 349/64 |

FOREIGN PATENT DOCUMENTS

| | | |
|---|---|---|
| CN | 1400499 A | 3/2003 |
| CN | 201103850 Y | 8/2008 |
| KR | 1020060048228 A | 5/2006 |
| TW | 200817776 A | 4/2008 |

OTHER PUBLICATIONS

KR Office Action issued Apr. 25, 2013.

* cited by examiner

*Primary Examiner* — Nathanael R Briggs
(74) *Attorney, Agent, or Firm* — Morgan, Lewis & Bockius LLP

(57) ABSTRACT

A backlight unit with uniform brightness (luminance) is disclosed.

The backlight unit includes: a plurality of light sources arranged at a fixed interval; a diffusion plate disposed on the light sources to primarily diffuse light emitted from the light sources; and a diffusion sheet configured to secondarily diffuse the primarily diffused light from the diffusion plate, wherein the surface of the diffusion sheet is divided into first regions not opposite to the light and second regions opposite to the light sources, and the diffusion sheet includes lens pattern portions formed on the second regions.

6 Claims, 4 Drawing Sheets

BACKLIGHT UNIT AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2008-0132719, filed on Dec. 23, 2008, which is hereby incorporated by reference in its entirety.

BACKGROUND

1. Field of the Disclosure

This disclosure relates to a backlight unit adapted to implement uniform brightness (or luminance) and an LCD device having the same.

2. Description of the Related Art

It is the trend that liquid crystal display (LCD) devices are widening their application fields because of their features, such as their light weight, slimness, a low driving voltage, and so on. This trend is confirmed in the ways in which the LCD devices have been applied to office automation equipment, audio equipment, video equipment, and so on. The LCD device controls a transmitting amount of light on the basis of image signals applied to a plurality of control switches, in order to display a picture.

The LCD device, which is not self-luminescent, includes a backlight unit irradiating light on the rear surface of an LCD panel in which a picture is displayed. The backlight unit is classified as either an edge type or a direct type in accordance with the disposition of its light source.

The edge type backlight unit includes a light source which is positioned at one edge of the LCD panel. Also, the edge type backlight unit applies light emitted from the light source to the entire surface of the LCD panel using a light guide panel. On the other hand, the direct type backlight unit includes a plurality of light sources arranged opposite the rear surface of the LCD panel. These plural light sources directly apply light to the rear surface of the LCD panel. As contrasted with the edge type backlight unit, the direct type backlight unit has advantages such as a higher brightness and a wider emission dimension of the plural light sources.

In addition, the backlight unit becomes larger in size corresponding to the increased size of the LCD device. Accordingly, the direct type backlight unit is generally applied to the LCD device. The LCD device employing the direct type backlight unit generally forces a plurality of light sources to be arranged separately from the rear surface of an LCD panel at a fixed interval.

However, as the plural light sources are disposed just under the LCD panel, the LCD device including the direct type backlight unit causes the plural light sources to be projected enough to be seen with the naked eye on the LCD panel.

To address this matter, the LCD device can increase the distance between the light sources and a diffusion plate disposed above them. In this case, the brightness difference between regions in which the light source is disposed and those where it is not can be improved. In other words, the LCD device can obtain uniform brightness. On the other hand, it is difficult to thinly manufacture an LCD device including the direct type backlight unit.

BRIEF SUMMARY

Accordingly, the present embodiments are directed to a backlight unit that substantially obviates one or more of problems due to the limitations and disadvantages of the related art, and an LCD device having the same.

An object of the present embodiment is to provide a backlight unit with uniform brightness (or luminance) and an LCD device having the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes: a plurality of light sources arranged at a fixed interval; a diffusion plate disposed on the light sources to primarily diffuse light emitted from the light sources; and a diffusion sheet configured to secondarily diffuse the primarily diffused light from the diffusion plate, wherein the surface of the diffusion sheet is divided into first regions not opposite to the light and second regions opposite to the light sources, and the diffusion sheet includes lens pattern portions formed on the second regions.

An LCD device according to another aspect of the present embodiment includes: a liquid crystal display panel; a plurality of light sources arranged at a fixed interval under the liquid crystal display panel; a diffusion plate disposed on the light sources to primarily diffuse light emitted from the light sources; and a diffusion sheet configured to secondarily diffuse the primarily diffused light from the diffusion plate, wherein the surface of the diffusion sheet is divided into first regions not opposite to the light and second regions opposite to the light sources, and the diffusion sheet includes lens pattern portions formed on the second regions.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
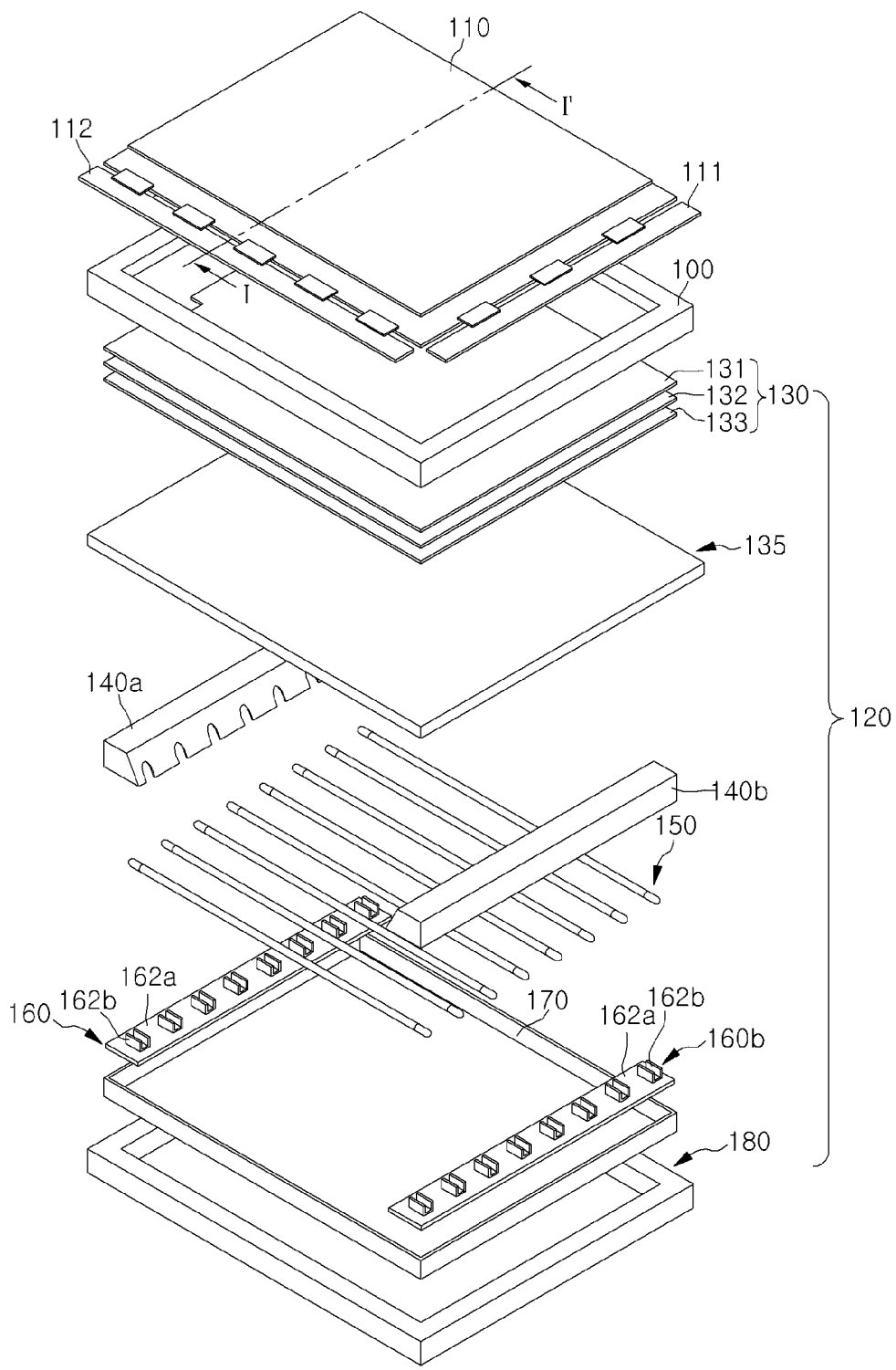
FIG. 1 is an exploded perspective view showing an LCD device with a direct type backlight unit according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
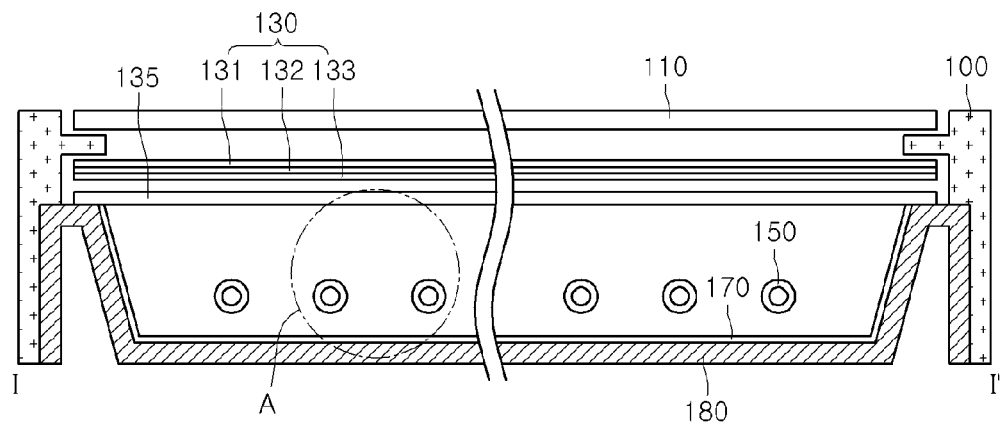
FIG. 2 is a cross-sectional view showing the LCD device with the direct type backlight unit taken along the line I-I' shown in FIG. 1.

FIG. 1 is an exploded perspective view showing an LCD device with a direct type backlight unit according to an embodiment of the present disclosure. FIG. 2 is a cross-sectional view showing the LCD device with the direct type backlight unit taken along the line I-I' shown in FIG. 1;

Referring to FIGS. 1 and 2, an LCD device according to a first embodiment of the present disclosure includes an LCD panel 110 for displaying an image, a backlight unit 120 disposed on the rear surface of the LCD panel 110 and providing light to the LCD panel 110, and a panel guide 100 combined with the backlight unit 120 and supporting the edge of the LCD panel 110.

Although it is not shown in detail in the drawings, the LCD panel 110 includes a thin film transistor (TFT) array substrate and a color filter substrate which are combined to face each other and maintain a uniform cell gap between them, as well as a liquid crystal layer interposed between the substrates. The TFT array substrate includes a plurality of gate lines formed on it, a plurality of data lines formed crossing the plural gate lines, and a TFT formed at each intersection of the gate and data lines.

A gate driver printed circuit board (PCB) 111 is provided on an edge of the LCD panel 110 and a data driver PCB 112 is provided on another edge of the LCD panel 110. The gate driver PCB 111 applies a scan signal to the gate line. The data driver PCB 112 applies data signals to the data lines. In this case, the gate driver PCB 111 and the data driver PCB 112 are electrically connected to the LCD panel 110 by means of a chip-on-film (COF). The COF can be replaced by a tape carrier package (TCP).

The first embodiment of the present disclosure will now be explained regarding only a direct type backlight unit included in an LCD device of at least 20 inches.

The backlight unit 120 includes a bottom cover 180 opened upward, a plurality of light sources 150 arranged separately from one another at a fixed interval on the bottom cover 180, a diffusion plate 135 disposed on the plural light sources 150 primarily dispersing light, optical sheets 130 disposed on the diffusion plate 135 and secondarily diffusing and converging light, and a reflective sheet 170 disposed under the plural light sources 150. The reflective sheet 170 reflects light progressing downwardly from the light sources toward the LCD panel 110.

The backlight unit 120 includes first and second light source drive portions 160a and 160b disposed at both ends of the plural light sources 150, and first and second support sides 140a and 140b disposed at both ends of the plural light sources 150. The first and second light source drive portions 160a and 160b apply a drive signal to the plural light sources 150. To this end, the first light source drive portion 160a includes a first drive PCB 162a, as well as first sockets 164a arranged on the first drive PCB 162a and connected to one end of the plural light sources 150. Similarly, the second light source drive portion 160b also includes a second drive PCB 162b, and second sockets 164b arranged on the second drive PCB 162b and connected to the other end of the plural light sources 150. The first and second support sides 140a and 140b guide light emitted from the light sources 150 to the edge areas of the LCD panel 110 and support the diffusion plate 135 and the optical sheets 130. The light sources 150 may include CCFLs (cold cathode fluorescent lamps), EEFLs (external electrode fluorescent lamps), or LEDs (light emission diodes).

The diffusion plate 135 primarily diffuses light and guides this primarily diffused light toward the optical sheets 130. Although it is not shown in the drawings, a reflective pattern is formed on the rear surface of the diffusion sheet 135.

The optical sheets 130 include a diffusion sheet 133 secondarily dispersing the primarily diffused light from the diffusion plate 135, a convergence sheet 132 converging the secondarily diffused light from the diffusion sheet 133 toward the LCD panel 110, and a protective sheet 131 disposed on and protecting the convergence sheet 132. The diffusion sheet 133 of the present embodiment is divided into first regions each opposite to the plural light sources 150 and second regions not opposite to the plural light sources 150. A lens pattern is formed on the second regions. The lens pattern prevents or minimizes the luminance difference between regions in which the plural light sources 150 are positioned and those where they are not.

Such a diffusion sheet 133 will now be explained referring to FIGS. 3 and 4.

Figure 3:
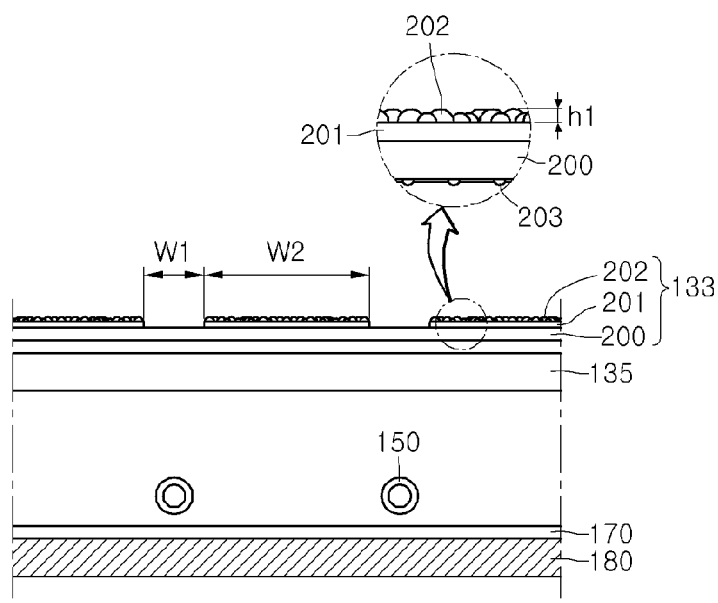
FIG. 3 is an enlarged cross-sectional view of part of the direct type backlight unit corresponding to the portion A shown in FIG. 2.

FIG. 3 is an enlarged cross-sectional view of part of the direct type backlight unit corresponding to the portion A shown in FIG. 2. FIG. 4 is a planar view showing a diffusion sheet according to another embodiment of the present disclosure. FIG. 5 is a graphic diagram representing luminance and luminance uniformity of the backlight unit with a diffusion sheet of the present embodiment.

Figure 4:
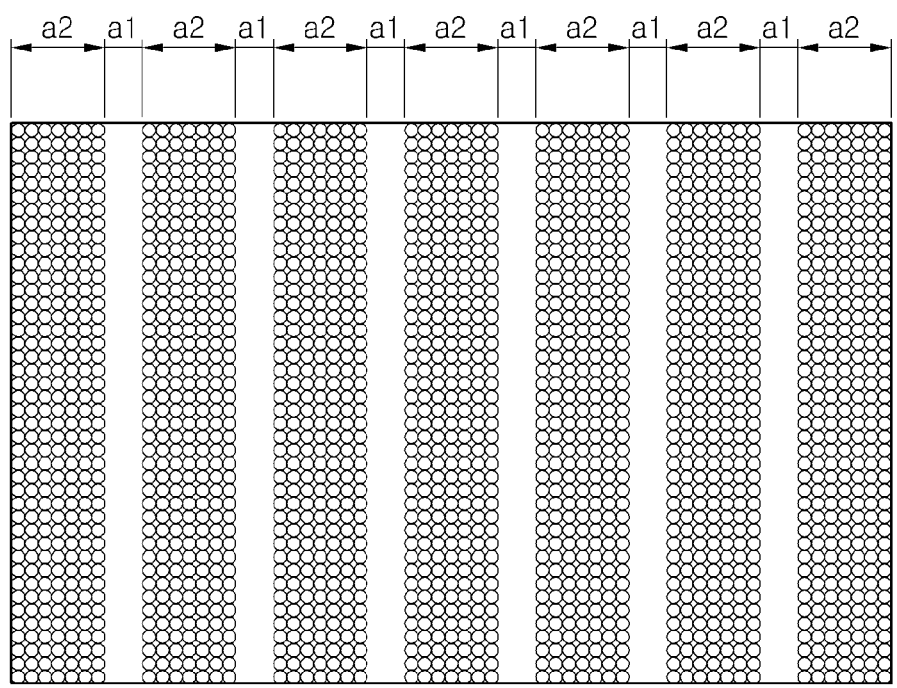
FIG. 4 is a planar view showing the surface of the diffusion sheet shown in FIGS. 1 to 3.
Figure 5:
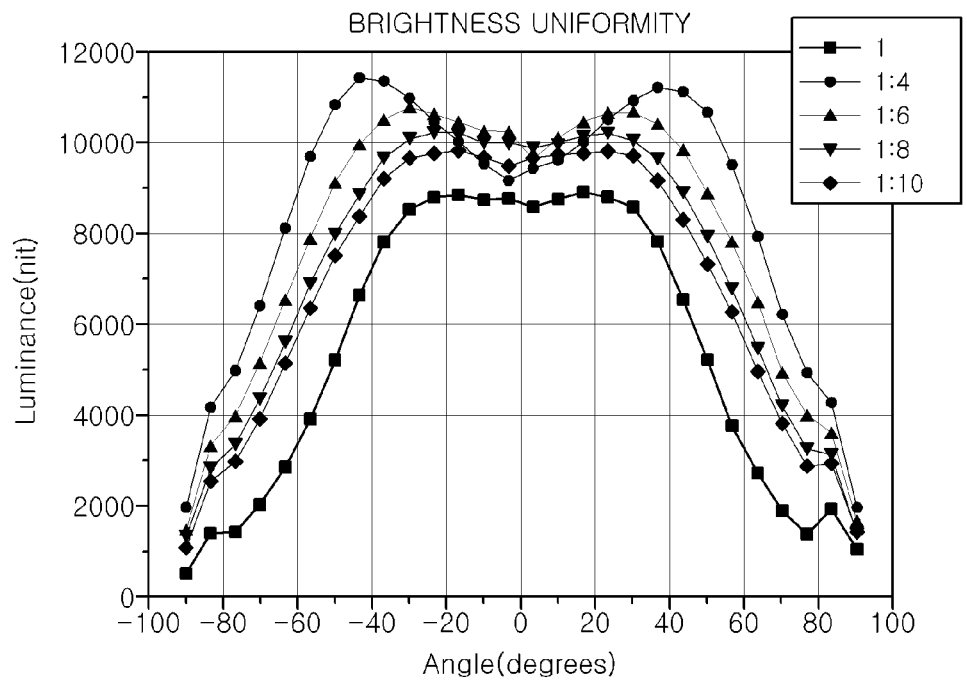
FIG. 5 is the graphic diagram of a data sheet measuring the luminance (or brightness) and luminance uniformity of the backlight unit with a diffusion sheet of the present embodiment.
Figure 5:
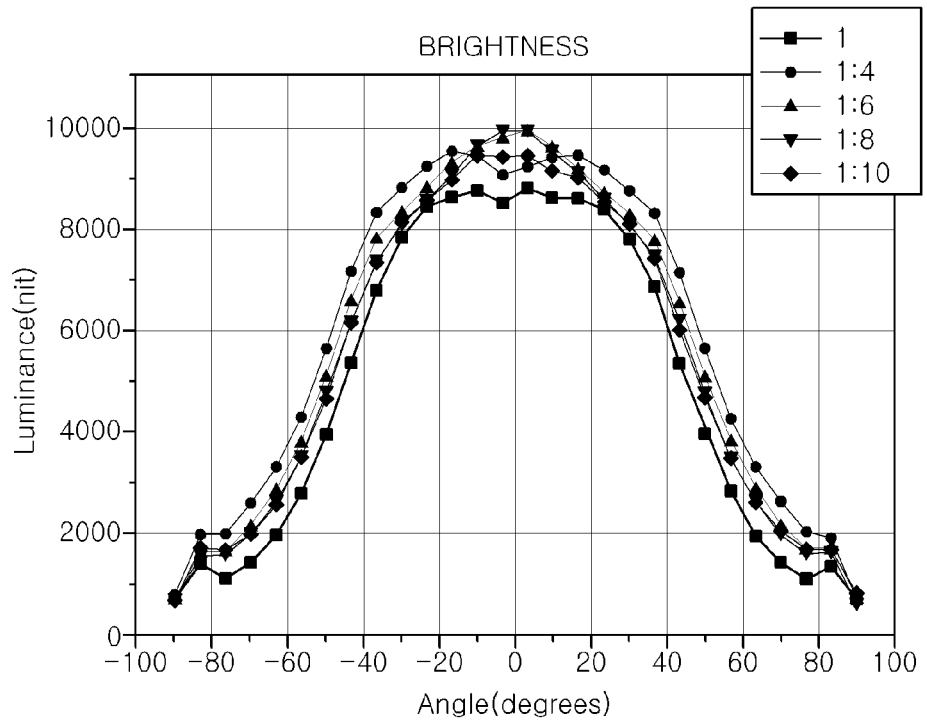

As shown in FIGS. 3 and 4, a direct type of the present embodiment divides the surface of a diffusion sheet 133 into first regions a1 opposite to a plurality of light sources 150 and second regions a2 not opposite to the plural light sources 150. The diffusion sheet 133 includes lens pattern portions each disposed on the second regions a2. Each of the lens pattern portions includes a plurality of lenses 202 scattered on an acryl resin layer 201.

More specifically, the diffusion sheet 133 includes a base sheet 200, the lens pattern portions formed on the base sheet 200 opposite to the second regions a2, and a diffusion pattern layer 203 formed on the rear surface of the base sheet 200. The base sheet 200 may be formed of poly ethylene terephthlate (PET) or polycarbonate (PC). Although it is not shown in the drawings, each of the lenses 202 has a pitch range of about 5 μm to 100 μm and is formed in a sphere shape on the acryl resin layer 201. Also, each of the lenses 202 is preferably formed protruding from the surface of the acryl resin layer 201 by a height range of about 2.5 μm to 50 μm. The first region a1 not being opposite the lens pattern portion and the second region a2 being opposite the lens pattern portion are preferably set at a width ratio of 1:8.

Although the lenses 202 are formed in the sphere shape, the present embodiment is not limited to this. In other words, the lenses included in the present embodiment can be formed in any one of a polyhedron shape, an oval shape, and so on.

The lens pattern portions are formed by jetting an acryl resin material mixed with the plural lenses 202 on the second regions a2 of the base sheet 200 and by hardening the jetted acryl resin material. The hardening process may selectively use a heat hardening method or a UV hardening method according to the kind of acryl resin materials used.

FIG. 5 is a graphic diagram of a data sheet measuring the brightness and brightness uniformity of a direct type backlight unit according to an embodiment of the present disclosure, along with the width ratio of the first region a1 not including the lens pattern portion and the second regions a2 each including the lens pattern portion. As seen in FIG. 5, it is evident that all of brightness and brightness uniformity can be impartially improved at the region width ratio of 1:8.

As described above, the LCD device including the direct type backlight unit according to an embodiment of the present disclosure defines the diffusion sheet 133 into first regions a1 not being opposite the light sources 150 and second regions a2 being opposite the light sources 150. Also, the LCD device allows the lens pattern portions to be formed only on the second regions a2 of the surface of the diffusion sheet 133. Therefore, the LCD device can improve entire brightness and can obtain uniform brightness. As a result, the LCD device can prevent brightness difference between the regions in which the light sources are disposed and those where it is not.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A backlight unit comprising:
a plurality of light sources arranged at a fixed interval;
a diffusion plate disposed on the light sources to primarily diffuse light emitted from the light sources; and
a diffusion sheet configured to secondarily diffuse the primarily diffused light from the diffusion plate,
wherein an upper surface of the diffusion sheet is divided into first regions and second regions, the first regions are opposite to the light sources, and the second regions includes lens pattern portions,
wherein the first regions consist of a flat structure,
wherein the lens pattern portions includes an acryl resin layer and lenses formed in a sphere shape on the acryl resin layer,
wherein the widths of the first and second regions are defined at a ratio of 1:8.

2. The backlight unit according to claim 1, wherein the lens is in a pitch range of 5 μm to 100 μm.

3. The backlight unit according to claim 1, wherein the lens is exposed from the surface of the acryl resin layer by a height range of 2.5 μm to 50 μm.

4. A liquid crystal display device comprising:
a liquid crystal display panel;
a plurality of light sources arranged at a fixed interval under the liquid crystal display panel;
a diffusion plate disposed on the light sources to primarily diffuse light emitted from the light sources; and
a diffusion sheet configured to secondarily diffuse the primarily diffused light from the diffusion plate,
wherein an upper surface of the diffusion sheet is divided into first regions and second regions, the first regions are opposite to the light sources, and the second regions includes lens pattern portions,
wherein the first regions consist of a flat structure,
wherein the lens pattern portions includes an acryl resin layer and lenses formed in a sphere shape on the acryl resin layer,
wherein the widths of the first and second regions are defined at a ratio of 1:8.

5. The liquid crystal display device according to claim 4, wherein the lens is in a pitch range of 5 μm to 100 μm.

6. The liquid crystal display device according to claim 4, wherein the lens is exposed from the surface of the acryl resin layer by a height range of 2.5 μm to 50 μm.

* * * * *